US012567522B2

(12) United States Patent
Fukushima

(10) Patent No.: US 12,567,522 B2
(45) Date of Patent: Mar. 3, 2026

(54) ELECTRIC COMPONENT

(71) Applicant: Tokyo Cosmos Electric Co., Ltd., Kanagawa (JP)

(72) Inventor: Hajime Fukushima, Kanagawa (JP)

(73) Assignee: Tokyo Cosmos Electric Co., Ltd., Zama (JP)

( * ) Notice: Subject to any disclaimer, the term of this patent is extended or adjusted under 35 U.S.C. 154(b) by 402 days.

(21) Appl. No.: 18/037,092

(22) PCT Filed: Oct. 13, 2021

(86) PCT No.: PCT/JP2021/037888

§ 371 (c)(1),
(2) Date: May 16, 2023

(87) PCT Pub. No.: WO2022/107506

PCT Pub. Date: May 27, 2022

(65) Prior Publication Data

US 2023/0343490 A1 Oct. 26, 2023

(30) Foreign Application Priority Data

Nov. 17, 2020 (JP) ................................ 2020-190921

(51) Int. Cl.
*H01C 1/01* (2006.01)
*H01C 1/14* (2006.01)

(52) U.S. Cl.
CPC ................ *H01C 1/01* (2013.01); *H01C 1/14* (2013.01)

(58) Field of Classification Search
CPC .................................. H01C 1/01; H01C 1/14
See application file for complete search history.

(56) References Cited

U.S. PATENT DOCUMENTS

| | | | | |
|---|---|---|---|---|
| 10,163,552 | B2 * | 12/2018 | Huang .................. | H01C 10/34 |
| 2004/0016567 | A1 | 1/2004 | Yamasaki et al. | |

FOREIGN PATENT DOCUMENTS

| | | | |
|---|---|---|---|
| JP | 53-013250 | | 2/1978 |
| JP | 56-065604 | | 6/1981 |
| JP | 60-076876 | | 5/1985 |
| JP | S62147388 | * | 9/1987 |
| JP | 10-070016 | | 3/1998 |
| JP | 2002151824 | * | 5/2002 |
| JP | 2002-305363 | | 10/2002 |
| JP | 6530870 | | 6/2019 |

OTHER PUBLICATIONS

JPS62147388 translation (Year: 1987).*
JP2002151824 translation (Year: 2002).*

* cited by examiner

*Primary Examiner* — Kyung S Lee

(57) ABSTRACT

Provided is an electric component which mitigates stress acting on a terminal. This electric component comprises: an operation part disposed so as to extend in a predetermined direction; an electrical processing part which has a terminal protruding in a direction crossing the extension direction of the operation part and outputs an electrical signal in response to an operation of the operation part; and a plurality of fixation parts which are disposed so as to sandwich the terminal in the extension direction and protrude in the protrusion direction of the terminal.

5 Claims, 3 Drawing Sheets

ELECTRIC COMPONENT

TECHNICAL FIELD

The present disclosure relates to an electric component.

BACKGROUND ART

Conventionally, for example, an electric component such as a variable resistor that outputs an electric signal corresponding to an operation of an operating portion has been practically used. This electric component is used, for example, for switching power supply, adjusting volume, changing channels, and the like. Such an electric component has been required to improve the durability of the component for the operation of the operating portion.

Then, as a technique for improving the durability of the component for the operation, for example, Patent Literature (hereinafter, referred to as PTL) 1 has proposed a switching device for a variable resistor enabling a structure in which a portion of a spring member not supported by another member is less likely to be displaced in the direction approaching a board while the durability of a rotation member is ensured. This device can enhance the durability of the rotation member by reducing contact between the rotation member and the spring member in accordance with the operation.

CITATION LIST

Patent Literature

PTL 1
Japanese Patent No. 6530870

SUMMARY OF INVENTION

Technical Problem

However, the device of PTL 1 is fixed to a housing or the like of a product at a bearing portion disposed between an operation shaft and a variable resistor, when the device is attached to the product. Thus, when the operation shaft comes into contact with an obstacle, an external force that swings the variable resistor about the bearing portion is caused, and the stress is possibly concentrated on a terminal provided in the variable resistor.

An object of the present disclosure is to provide an electric component that reduces stress applied to a terminal.

Solution to Problem

An electric component according to the present disclosure includes: an operating portion that is disposed so as to extend in a predetermined direction; an electric processing portion that includes a terminal protruding in a direction intersecting with an extending direction of the operating portion and outputs an electric signal corresponding to an operation of the operating portion; and a plurality of fixing portions that is disposed so as to interpose the terminal in between in the extending direction and protrudes in a protruding direction of the terminal.

Advantageous Effects of Invention

According to the present disclosure, it is possible to reduce stress applied to a terminal.

DESCRIPTION OF EMBODIMENTS

Hereinafter, embodiments of the present disclosure will be described with reference to the drawings.

Embodiment 1

Figure 1A:
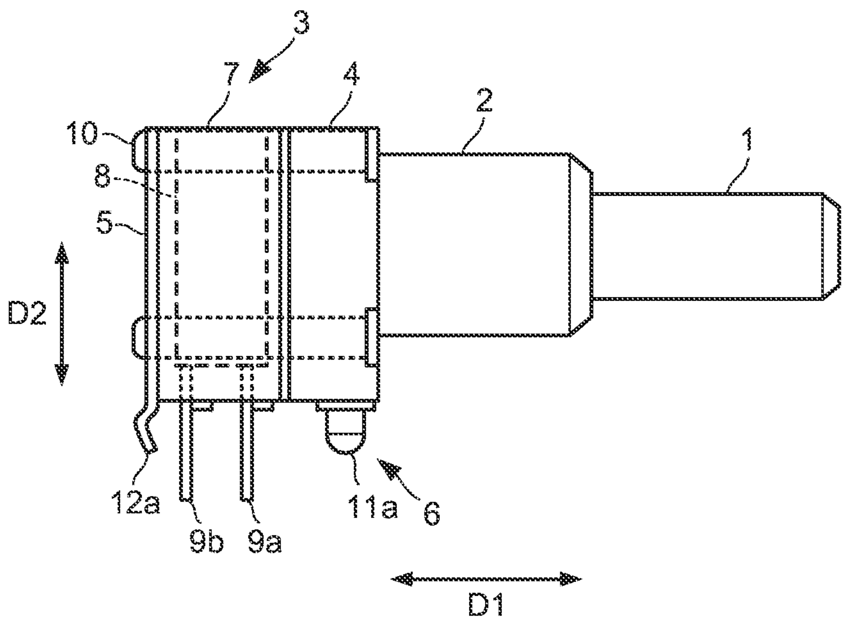
FIG. 1A illustrates a configuration of an electric component according to Embodiment 1 of the present disclosure.
Figure 1B:
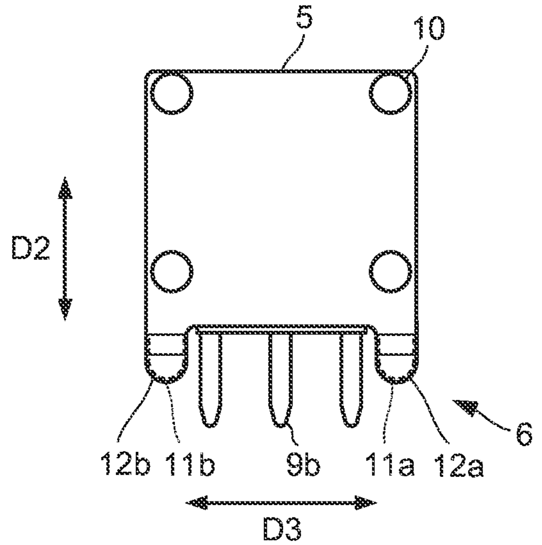
FIG. 1B further illustrates the configuration of the electric component according to Embodiment 1 of the present disclosure.

FIGS. 1A and 1B illustrate a configuration of an electric component according to Embodiment 1 of the present disclosure. The electric component includes operating portion 1, bearing portion 2, electric processing portion 3, two attaching portions 4 and 5, and a plurality of fixing portions 6. Note that the examples of the electric component include a variable resistor and a rotary encoder that output an electric signal corresponding to the rotation of operating portion 1.

Operating portion 1, which is rotationally operated by an operator, extends from a proximal end portion in a predetermined direction, and disposed so as to be rotatable about its own central axis.

Bearing portion 2, which rotatably supports an intermediate portion of operating portion 1, is disposed so as to cover the outer periphery of operating portion 1.

Electric processing portion 3, which is connected to a distal end portion of operating portion 1 to output an electric signal corresponding to the operation of operating portion 1, includes case 7, electric circuit 8, and terminals 9*a* and 9*b*.

Case 7 has a box shape so as to cover electric circuit 8, and is disposed on the side of the distal end portion of operating portion 1 with respect to bearing portion 2. Case 7 can be made of a resin material, and is made of, for example, a polybutylene terephthalate resin, a liquid crystal polymer, or the like.

Electric circuit 8 is disposed in case 7 and connected to the distal end portion of operation portion 1, and generates an electric signal corresponding to the operation of operating portion 1. For example, electric circuit 8 can change voltage in accordance with the rotational position of operating portion 1, and generate the voltage as an electric signal.

Electric circuit 8 can also convert the rotational position of operating portion 1 into a digital amount, and generate the digital amount as an electric signal.

Terminals 9*a* and 9*b*, which are electrically connected to an external board (not illustrated) to output an electric signal generated by electric circuit 8, are electrically connected to electric circuit 8 and are formed so as to extend from electric circuit 8 in protruding direction D2 orthogonal to extending direction D1 of operating portion 1. That is, terminals 9*a* and 9*b* are formed so as to extend toward the bottom surface of case 7. Then, terminals 9*a* and 9*b* are formed so as to penetrate the bottom surface of case 7 and protrude to the outside of case 7 in protruding direction D2.

Terminals 9*a* and 9*b* are each disposed so that three terminals align in width direction D3 orthogonal to extending direction D1 and protruding direction D2. That is, terminals 9*a* and 9*b* are constituted of six terminals in total.

Note that terminal 9*a* and terminal 9*b* can be connected to electric circuit 8 so as to output electric signals different from each other. For example, terminal 9*a* outputs an electric signal corresponding to the amount of the rotating operation of operating portion 1 in one direction, and terminal 9*b* outputs an electric signal corresponding to the amount of the rotating operation of operating portion 1 in another direction.

Attaching portion 4 is disposed between bearing portion 2 and electric processing portion 3, and is formed so as to extend in a planar state along the outside of electric processing portion 3. Specifically, attaching portion 4 has a plate shape having a relatively large thickness, and is formed so as to extend over the entire front surface of case 7 while being in contact with the front surface. That is, attaching portion 4 is formed to have substantially the same length as case 7 in protruding direction D2 and width direction D3. Further, attaching portion 4 is made of a metal material and is integrally joined to bearing portion 2.

Attaching portion 5 is disposed so as to interpose electric processing portion 3 with attaching portion 4 between attaching portion 5 and attaching portion 4, and is formed so as to extend in a planar state along the outside of electric processing portion 3. Specifically, attaching portion 5 has a plate shape and is formed so as to extend over the entire back surface of case 7 while being in contact with the back surface. That is, attaching portion 5 is formed to have substantially the same length as case 7 in protruding direction D2 and width direction D3. Further, attaching portion 5 is made of a metal material.

In this state, four fasteners 10 extending in extending direction D1 so as to penetrate attaching portion 4, electric processing portion 3, and attaching portion 5 are disposed, and fasteners 10 fix attaching portion 4, electric processing portion 3, and attaching portion 5 to each other. Fastener 10 is made of a metal material such as aluminum.

A plurality of fixing portions 6, which is fixed to an external board (not illustrated) to which terminals 9*a* and 9*b* are electrically connected, is disposed so as to interpose terminals 9*a* and 9*b* between fixing portions 6 in extending direction D1 and formed so as to protrude from the bottom edge portions of attaching portions 4 and 5 in protruding direction D2 of terminals 9*a* and 9*b*. At this time, because the bottom edge portions of attaching portions 4 and 5 are disposed at substantially the same position as the bottom surface of case 7 in protruding direction D2, fixing portions 6 protrude from substantially the same position as terminals 9*a* and 9*b* in protruding direction D2.

Specifically, fixing portion 6 includes a pair of front-side fixing portions 11*a* and 11*b*, and a pair of back-side fixing portions 12*a* and 12*b*.

Front-side fixing portions 11*a* and 11*b* are disposed so as to protrude from the bottom edge portion of attaching portion 4 in protruding direction D2. Front-side fixing portions 11*a* and 11*b* are disposed on the side of the proximal end portion of operating portion 1 with respect to terminals 9*a* and 9*b*, and are formed so as to interpose terminals 9*a* and 9*b* between front-side fixing portions 11*a* and 11*b* in width direction D3. Further, front-side fixing portions 11*a* and 11*b* are each formed in a columnar shape, specifically, formed of a so-called round pin having a cylindrical shape.

In this state, front-side fixing portions 11*a* and 11*b* are made of a metal material and are integrally joined to attaching portion 4. That is, bearing portion 2, attaching portion 4, and front-side fixing portions 11*a* and 11*b* are integrally joined to each other. Bearing portion 2, attaching portion 4, and front-side fixing portions 11*a* and 11*b* can be integrally formed by, for example, metal injection molding, die casting, or the like.

Back-side fixing portions 12*a* and 12*b* protrude from the bottom edge portion of attaching portion 5 in protruding direction D2, and are formed so as to interpose terminals 9*a* and 9*b* with front-side fixing portions 11*a* and 11*b* between back-side fixing portions 12*a* and 12*b* and front side fixing portions 11*a* and 11*b* in extending direction D1. Further, back-side fixing portions 12*a* and 12*b* are disposed so as to interpose terminals 9*a* and 9*b* in between in width direction D3. Back-side fixing portions 12*a* and 12*b* are each formed in a plate shape, specifically, formed of a so-called bending terminal obtained by bending a plate-shaped member. Note that back-side fixing portions 12*a* and 12*b* have substantially the same width as front-side fixing portions 11*a* and 11*b*, and are disposed at substantially the same positions as front-side fixing portions 11*a* and 11*b* in width direction D3. In this state, back-side fixing portions 12*a* and 12*b* are made of a metal material and are integrally joined to attaching portion 5.

As described above, fixing portion 6 is integrally joined to attaching portions 4 and 5. Therefore, the number of components of the electric component can be reduced, which can make the assembling of the electric component easier. In particular, the number of components of the electric component can be greatly reduced by integrally joining front-side fixing portions 11*a* and 11*b* to attaching portion 4 and bearing portion 2, which can make the assembling of the electric component even easier.

Next, a method of attaching the electric component to the external board will be described.

Figure 2:
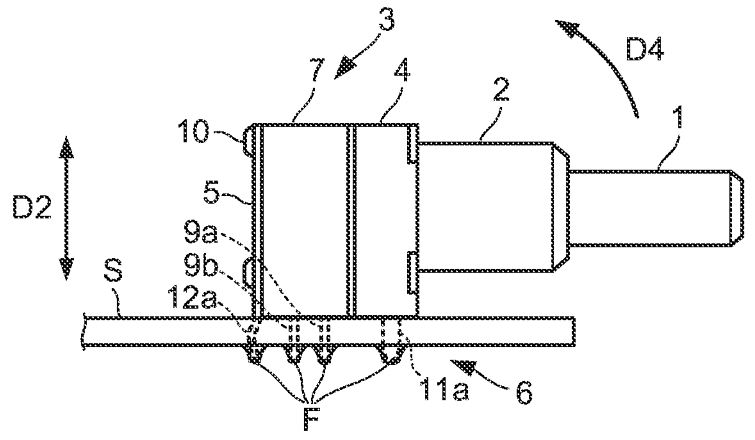
FIG. 2 illustrates a state in which a terminal and a fixing portion are fixed to an external board.

First, as illustrated in FIG. 2, front-side fixing portions 11*a* and 11*b*, back-side fixing portions 12*a* and 12*b*, and terminals 9*a* and 9*b* are inserted into through holes formed in external board S, and fixed to external board S with fixing agent F such as solder.

In this state, front-side fixing portions 11*a* and 11*b* and back-side fixing portions 12*a* and 12*b* are formed so as to protrude in protruding direction D2 that is the same protruding direction as terminals 9*a* and 9*b*, so that front-side fixing portions 11*a* and 11*b* and back-side fixing portions 12*a* and 12*b* can be inserted simultaneously with terminals 9*a* and 9*b* into through holes of external board S, and can be easily fixed with fixing agent F.

At this time, terminals 9*a* and 9*b* are electrically connected to a non-ground point formed on external board S. On the other hand, front-side fixing portions 11*a* and 11*b* and back-side fixing portions 12*a* and 12*b* are electrically connected to a ground point formed on external board S. Front-side fixing portions 11*a* and 11*b* and back-side fixing portions 12*a* and 12*b* are electrically connected to attaching portions 4 and 5 and fastener 10, so that attaching portions 4 and 5 and fastener 10 are electrically connected to the ground point of external board S via front-side fixing portions 11*a* and 11*b* and back-side fixing portions 12*a* and 12*b*.

Next, an operation of the present embodiment will be described.

Figure 3:
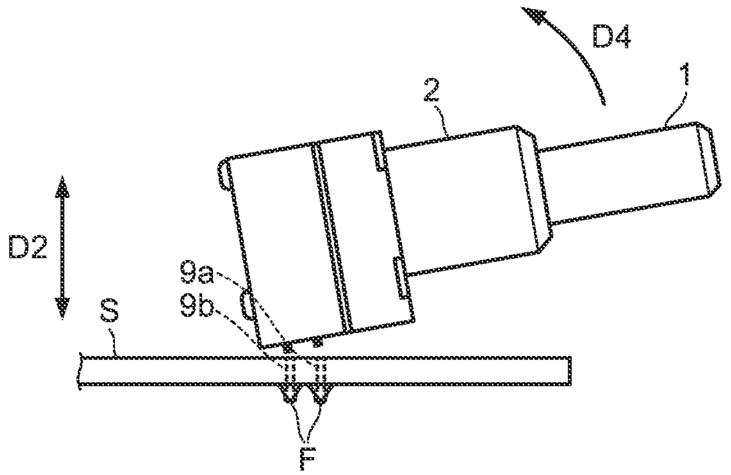
FIG. 3 illustrates a state in which a terminal is disconnected by stress.

First, as illustrated in FIG. 2, operating portion 1 is rotationally operated. In response to this operation of operating portion 1, terminals 9*a* and 9*b* are possibly stressed in stressing direction D4 away from external board S. Further, when operating portion 1 comes into contact with an obstacle or the like, similar stress is applied to terminals 9*a* and 9*b*. At this time, as illustrated in FIG. 3, when fixing portion 6 is not fixed to external board S, terminals 9*a* and 9*b* are possibly disconnected by the stress in stressing direction D4.

Then, as illustrated in FIGS. 1A and 1B, a plurality of fixing portions 6 protruding in protruding direction D2 of terminals 9*a* and 9*b* is disposed so as to interpose terminals 9*a* and 9*b* in between in extending direction D1. Accordingly, fixing portions 6 support electric processing portion 3 on the outside of terminals 9*a* and 9*b* in stressing direction D4, so that the stress applied to terminals 9*a* and 9*b* can be reduced, and thus the disconnection of terminals 9*a* and 9*b* can be reduced.

Further, fixing portions 6 support electric processing portion 3, so that the stress applied to terminals 9*a* and 9*b* can be reduced without fixing bearing portion 2 to the housing or the like of the product. Therefore, the labor of fixing bearing portion 2 with a fixing tool such as a nut can be eliminated, and the electric component can be easily assembled.

Further, fixing portion 6 is disposed so as to protrude from substantially the same position as terminals 9*a* and 9*b* in protruding direction D2. Thus, fixing portion 6 is fixed to external board S in substantially the same plane as terminals 9*a* and 9*b*, so that the stress applied to terminals 9*a* and 9*b* can be reliably reduced.

Further, front-side fixing portions 11*a* and 11*b* are disposed so as to interpose terminals 9*a* and 9*b* in between in width direction D3. Thus, electric processing portion 3 can be supported in width direction D3, and the stress applied to terminals 9*a* and 9*b* can be reliably reduced. At this time, front-side fixing portions 11*a* and 11*b* are disposed on the outside of terminals 9*a* and 9*b* in width direction D3, so that the stress applied to terminals 9*a* and 9*b* can be more reliably reduced.

Similarly, back-side fixing portions 12*a* and 12*b* are disposed so as to interpose terminals 9*a* and 9*b* in between in width direction D3. Thus, electric processing portion 3 can be supported in width direction D3, and the stress applied to terminals 9*a* and 9*b* can be reliably reduced. Further, back-side fixing portions 12*a* and 12*b* are disposed on the outside of terminals 9*a* and 9*b* in width direction D3, so that the stress applied to terminals 9*a* and 9*b* can be more reliably reduced.

Furthermore, back-side fixing portions 12*a* and 12*b* are disposed at substantially the same position as front-side fixing portions 11*a* and 11*b* in width direction D3. Thus, entire electric processing portion 3 can be stably supported, and the stress applied to terminals 9*a* and 9*b* can be reliably reduced.

In addition, front-side fixing portions 11*a* and 11*b* are formed in columnar shapes, and can firmly support electric processing portion 3 compared with a plate-shaped fixing portion. Therefore, the stress applied to terminals 9*a* and 9*b* can be reliably reduced. Further, front-side fixing portions 11*a* and 11*b* to which a large stress is applied from the proximal end portion of operating portion 1 compared with back-side fixing portions 12*a* and 12*b* are formed in columnar shapes, so that the stress applied to terminals 9*a* and 9*b* can be reliably reduced.

When operating portion 1 is operated while the stress applied to terminals 9*a* and 9*b* is reduced as described above, an electric signal corresponding to the operation amount of operating portion 1 is generated in electric circuit 8. Then, the electric signal generated in electric circuit 8 is output to the non-ground point formed on external board S via terminals 9*a* and 9*b*. At this time, disconnection of terminals 9*a* and 9*b* is reduced by fixing portion 6, and thus the electric signal generated in electric circuit 8 can be reliably output to the non-ground point of external board S.

In this state, fixing portion 6 is made of a metal material and is electrically connected to the ground point of external board S. Thus, electric circuit 8 can be electrically shielded by attaching portions 4 and 5 and fastener 10 made of a metal material, and the generation of noises in the electric signal to be output from terminals 9*a* and 9*b* can be reduced. At this time, attaching portions 4 and 5 and fastener 10 are disposed so as to surround electric circuit 8. Thus, the generation of noises in the electric signal can be reliably reduced.

In this manner, the electric signal output from terminals 9*a* and 9*b* is transmitted to an electronic component or the like connected to the non-ground point of external board S. For example, when the non-ground point of external board S is connected to an electronic component for adjusting the volume of the radio or the like, the volume is adjusted based on the electric signal corresponding to the operation amount of operating portion 1.

According to the present embodiment, a plurality of fixing portions 6 protruding in protruding direction D2 of terminals 9*a* and 9*b* is disposed so as to interpose terminals 9*a* and 9*b* in between in extending direction D1. Thus, when fixing portions 6 are fixed to external board S, fixing portions 6 support electric processing portion 3 on the outside of terminals 9*a* and 9*b* in stressing direction D4, so that the stress applied to terminals 9*a* and 9*b* can be reduced.

Embodiment 2

Hereinafter, Embodiment 2 of the present disclosure will be described. In the present embodiment, differences from above-described Embodiment 1 will be mainly described. The common reference numerals will be used for points in common with above-described Embodiment 1, and detailed description thereof will be omitted.

In above-described Embodiment 1, fixing portion 6 is formed so as to include front-side fixing portions 11*a* and 11*b* formed in columnar shapes and back-side fixing portions 12*a* and 12*b* formed in plate shapes, but fixing portion 6 is not limited thereto as long as fixing portion 6 protrudes in protruding direction D2 of terminals 9*a* and 9*b*.

Figure 4A:
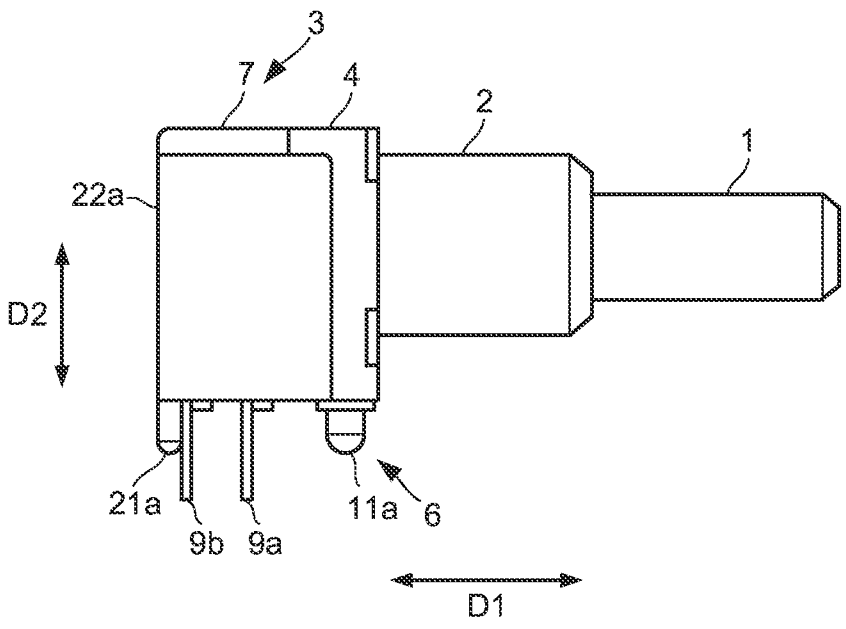
FIG. 4A illustrates a configuration of an electric component according to Embodiment 2.
Figure 4B:
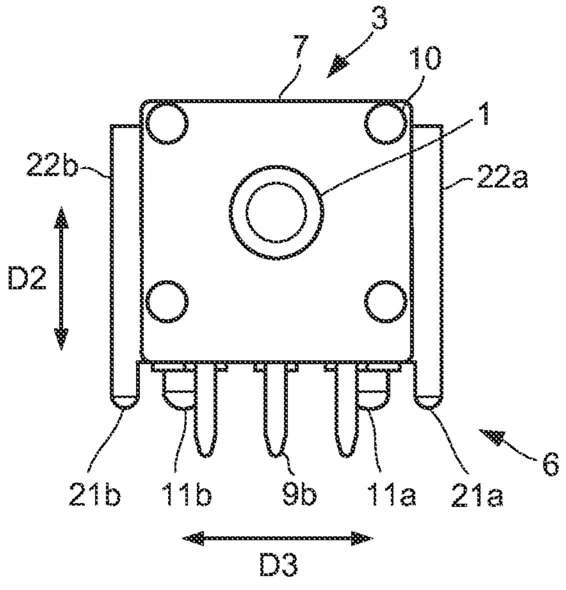
FIG. 4B further illustrates the configuration of the electric component according to Embodiment 2.

For example, as illustrated in FIGS. 4A and 4B, a pair of back-side fixing portions 21*a* and 21*b* can be disposed instead of a pair of back-side fixing portions 12*a* and 12*b* of Embodiment 1, and a pair of attaching portions 22*a* and 22*b* can be disposed instead of attaching portion 5.

Attaching portions 22*a* and 22*b* are disposed so as to interpose electric processing portion 3 in between in width direction D3, and are formed so as to extend in a planar state along the outside of electric processing portion 3. Specifically, attaching portions 22*a* and 22*b* have plate shapes and are formed so as to extend over substantially the entire side surface of case 7 while being in contact with the side surface. Further, attaching portions 22*a* and 22*b* are made of a metal material and are integrally joined to attaching portion 4.

Back-side fixing portions 21*a* and 21*b* are disposed on the bottom edge portions of attaching portions 22*a* and 22*b*, respectively, at the positions interposing terminals 9*a* and 9*b* with front-side fixing portions 11*a* and 11*b* in extending direction D1, and are formed so as to protrude from the positions in protruding direction D2. Further, back-side fixing portions 21*a* and 21*b* are disposed so as to interpose terminals 9*a* and 9*b* in between in width direction D3. At this time, back-side fixing portions 21*a* and 21*b* are disposed on the outside of front-side fixing portions 11*a* and 11*b* in width direction D3. Further, back-side fixing portions 21*a* and 21*b* are formed in columnar shapes, specifically, formed of so-called round pins having cylindrical shapes.

Furthermore, back-side fixing portions 21*a* and 21*b* are made of a metal material and are integrally joined to attaching portions 22*a* and 22*b*, respectively. That is, bearing portion 2, attaching portion 4, front-side fixing portions 11*a* and 11*b*, attaching portions 22*a* and 22*b*, and back-side fixing portions 21*a* and 21*b* are integrally joined to each other. Accordingly, the number of components of the electric component can be greatly reduced, which can make the assembling of the electric component easier.

Note that the back surface of case 7 includes an opening portion from which the distal end portion of operating portion 1 is exposed. Thus, a plurality of electric processing portions can be connected to the back side of electric processing portion 3, and an electric signal corresponding to the operation of operating portion 1 can be output from the plurality of electric processing portions.

Fixing front-side fixing portions 11*a* and 11*b* and back-side fixing portion 21*a* and 21*b* to external board S with such a configuration can reduce the stress applied to terminals 9*a* and 9*b*, and can reduce the disconnection of terminals 9*a* and 9*b*.

At this time, front-side fixing portions 11*a* and 11*b* and back-side fixing portion 21*a* and 21*b* are formed in columnar shapes; therefore, electric processing portion 3 can be supported more firmly, and the stress applied to terminals 9*a* and 9*b* can be reliably reduced.

Further, back-side fixing portions 21*a* and 21*b* are disposed on the outside of front-side fixing portions 11*a* and 11*b* in width direction D3; therefore, electric processing portion 3 can be supported more stably, and the stress applied to terminals 9*a* and 9*b* can be reliably reduced. At this time, back-side fixing portions 21*a* and 21*b* are provided on attaching portions 22*a* and 22*b* disposed on the side of case 7, and are disposed on the outside of front-side fixing portions 11*a* and 11*b* in width direction D3 while being largely shifted from front-side fixing portions 11*a* and 11*b*. Therefore, the stress applied to terminals 9*a* and 9*b* can be more reliably reduced.

In addition, attaching portions 22*a* and 22*b* are formed so as to extend over substantially the entire side surface of case 7 while being in contact with the side surface. This can electrically shield electric circuit 8 and reduce the generation of noises in the electric signal output from terminals 9*a* and 9*b*.

According to the present embodiment, back-side fixing portions 21*a* and 21*b* are formed in columnar shapes, which can firmly support electric processing portion 3, and thus the stress applied to terminals 9*a* and 9*b* can be reliably reduced.

Note that, in above-described Embodiments 1 and 2, the plurality of fixing portions 6 is fixed to external board S with a fixing agent, but fixing portions 6 are not limited thereto as long as fixing portions 6 can be fixed to external board S.

Further, in above-described Embodiments 1 and 2, fixing portions 6 are integrally joined to the attaching portion, but fixing portions 6 are not limited thereto as long as fixing portions 6 protrude in protruding direction D2 of the terminal.

Further, in above-described Embodiments 1 and 2, fixing portions 6 are constituted of a pair of front-side fixing portions 11*a* and 11*b* and a pair of back-side fixing portions, but fixing portions 6 are not limited thereto as long as fixing portions 6 are disposed so as to interpose the terminal in between in extending direction D1. For example, fixing portions 6 can be constituted of a pair of front-side fixing portions and one back-side fixing portion.

Further, in above-described Embodiments 1 and 2, the attaching portion is disposed so as to be in contact with the outer surface of case 7, but the attaching portion is required to at least extend in a plate state along the outside of the electric processing portion, and may be disposed apart from case 7.

Furthermore, in above-described Embodiments 1 and 2, bearing portion 2 can also be fixed to the housing of the product or the like with a fixing tool such as a nut. Thus, the stress applied to terminals 9*a* and 9*b* can be more reliably reduced.

Further, in above-described Embodiments 1 and 2, operating portion 1 is rotatably disposed about its own central axis, but operating portion 1 is not limited thereto as long as operating portion 1 is disposed so as to extend in extending direction D1. For example, operating portion 1 may be disposed so as to swing. Accordingly, an electric signal corresponding to the swinging operation of operating portion 1 is output from the electric processing portion.

In addition, the above-described embodiments merely describe examples of implementations for practicing the present invention, and should not be construed as limiting the technical scope of the present invention. In other words, the present invention can be implemented in various forms without departing from the scope, or essential features thereof. For example, the shape, the number, and the like of each component described in the above-described embodiments are merely examples, and can be appropriately modified and implemented.

This application is based on Japanese Patent No. 2020-190921 filed on Nov. 17, 2020, the disclosure of which including the specification, drawings and abstract is incorporated herein by reference in its entirety.

INDUSTRIAL APPLICABILITY

An electric component according to the present disclosure is useful as an electric component including a terminal protruding in the direction intersecting with an extending direction of an operating portion.

REFERENCE SIGNS LIST

1 Operating Portion
2 Bearing portion
3 Electric processing portion
4, 5, 22*a*, 22*b* Attaching portion
6 Fixing portion
7 Case
8 Electric circuit
9*a*, 9*b* Terminal
10 Fastener
11*a*, 11*b* Front-side fixing portion
12*a*, 12*b*, 21*a*, 21*b* Back-side fixing portion
D1 Extending direction
D2 Protruding direction
D3 Width direction
D4 Stressing direction
F Fixing agent
S External board

The invention claimed is:

1. An electric component, comprising:

an operating portion that is disposed so as to extend in a predetermined direction;

an electric processing portion that includes a terminal protruding in a direction intersecting with an extending direction of the operating portion and outputs an electric signal corresponding to an operation of the operating portion;

a plurality of fixing portions that is disposed so as to interpose the terminal in between in the extending direction and protrudes in a protruding direction of the terminal; and an attaching portion that is made of a metal material, the attaching portion being disposed so as to extend in a planar state along an outside of the electric processing portion and being a portion to which the plurality of fixing portions is integrally joined, wherein the plurality of fixing portions is inserted into a through hole formed in an external board to which the terminal is electrically connected, and is fixed with a fixing agent, and the plurality of fixing portions is made of a metal material and electrically connected to a ground point of the external board.

2. The electric component according to claim 1, wherein the plurality of fixing portions includes a pair of front-side fixing portions disposed so as to interpose the terminal in between in a width direction intersecting with the extending direction and the protruding direction on a side of a proximal end portion of the operating portion with respect to the terminal, and a pair of back-side fixing portions disposed so as to interpose the terminal in between in the width direction on an opposite side to the pair of front-side fixing portions with respect to the terminal.

3. The electric component according to claim 2, wherein the pair of front-side fixing portions is formed in columnar shapes, and the pair of back-side fixing portions is formed in plate shapes.

4. The electric component according to claim 2, wherein the pair of front-side fixing portions and the pair of back-side fixing portions are formed in columnar shapes.

5. The electric component according to claim 2, wherein the pair of back-side fixing portions is disposed on an outside of the pair of front-side fixing portions in the width direction.

* * * * *